(12) United States Patent
Gutekunst et al.

(10) Patent No.: US 11,504,717 B2
(45) Date of Patent: Nov. 22, 2022

(54) METHOD AND DEVICE FOR OPTICALLY EXCITING A PLURALITY OF ANALYTES IN AN ARRAY OF REACTION VESSELS AND FOR SENSING FLUORESCENT LIGHT FROM THE ANALYTES

(71) Applicant: Hain Lifescience GmbH, Nehren (DE)

(72) Inventors: Martin Gutekunst, Huglfing (DE); Hans-Joachim Polland, Wolfratshausen (DE)

(73) Assignee: Hain Lifescience GmbH, Nehren (DE)

( * ) Notice: Subject to any disclaimer, the term of this patent is extended or adjusted under 35 U.S.C. 154(b) by 325 days.

(21) Appl. No.: 16/343,535

(22) PCT Filed: Oct. 19, 2017

(86) PCT No.: PCT/EP2017/076664
§ 371 (c)(1),
(2) Date: Apr. 19, 2019

(87) PCT Pub. No.: WO2018/073326
PCT Pub. Date: Apr. 26, 2018

(65) Prior Publication Data
US 2019/0240657 A1    Aug. 8, 2019

(30) Foreign Application Priority Data

Oct. 20, 2016   (EP) ..................... 16194722

(51) Int. Cl.
*G01N 21/64*       (2006.01)
*B01L 3/00*         (2006.01)
(52) U.S. Cl.
CPC ......... *B01L 3/50853* (2013.01); *B01L 3/5085* (2013.01); *G01N 21/6452* (2013.01); *G01N 21/6486* (2013.01)

(58) Field of Classification Search
CPC ............ G01N 21/6452; G01N 21/6486; B01L 3/50853; B01L 3/5085
(Continued)

(56) References Cited

U.S. PATENT DOCUMENTS 5,355,215 A    10/1994  Schroeder et al.
7,687,260 B2   3/2010   Gutekunst
(Continued)

FOREIGN PATENT DOCUMENTS

CN      204389397 U    6/2015
EP       1202805 A1    5/2002
(Continued)

OTHER PUBLICATIONS

International Search Report from PCT/EP2017/076664.
International Preliminary Report on Patentability from PCT/EP2017/076664, dated Apr. 23, 2019.

*Primary Examiner* — Natalia Levkovich
(74) *Attorney, Agent, or Firm* — Curatolo Sidoti & Trillis Co., LPA; Salvatore A. Sidoti; Floyd Trillis, III

(57) ABSTRACT

The invention relates to a method and a device for optically exciting a plurality of analytes (12) in an array of reaction vessels (14) and for sensing fluorescent light from the analytes (12), wherein excitation light from an excitation light source (38) is supplied to the analytes (12) and wherein fluorescent light from the analytes (12) is simultaneously supplied to a fluorescent detector (34), wherein a plurality of beams (30) of the excitation light is directed into the reaction vessels (14) below the cover (28) through an array of holes (26) in a cover (28) arranged above the array of reaction vessels (14) and a plurality of beams (32) of the fluorescent light from the reaction vessels (14) reaches the fluorescent detector (34). According to the invention it is suggested that the main beams (76) of the plurality of beams (30) of the excitation light diverge within and below the holes (26) into (Continued)

the reaction vessels (14) and/or that the main beams (78) of the plurality of beams (32) of the fluorescent light converge within and above the holes (26) toward the fluorescent detector (34).

11 Claims, 4 Drawing Sheets

(58) Field of Classification Search
USPC .................................. 422/82.07, 82.08, 552
See application file for complete search history.

(56) References Cited

U.S. PATENT DOCUMENTS

| | | | |
|---|---|---|---|
| 9,506,865 | B2 | 11/2016 | Furlan et al. |
| 2006/0133080 | A1 | 6/2006 | Goldman |
| 2006/0152727 | A1* | 7/2006 | Bickmore, Jr. .... G01N 21/6452 |
| | | | 356/417 |
| 2006/0275847 | A1 | 12/2006 | Goodyer et al. |
| 2013/0034859 | A1* | 2/2013 | Boege ...................... G01J 3/10 |
| | | | 435/6.12 |

FOREIGN PATENT DOCUMENTS

| | | | |
|---|---|---|---|
| EP | 1681556 | B1 | 4/2007 |
| EP | 1619491 | B1 | 3/2009 |

\* cited by examiner

METHOD AND DEVICE FOR OPTICALLY EXCITING A PLURALITY OF ANALYTES IN AN ARRAY OF REACTION VESSELS AND FOR SENSING FLUORESCENT LIGHT FROM THE ANALYTES

The invention relates to a method and a device for optically exciting a plurality of analytes in an array of reaction vessels and for sensing fluorescent light from the analytes according to the preamble of claims 1 and 2, respectively. More particularly, the invention relates to the optical excitation of biological analytes or samples in reaction vessels by irradiation with excitation light to generate fluorescent light and to subsequently measure the intensity of the generated fluorescent light.

Methods and devices for exciting analytes by irradiation with excitation light, for example with UV light, as well as for sensing and measuring the intensity of the fluorescent light generated in the analyte by the excitation above all are employed in the examination of biological analytes containing proteins, RNA, or DNA.

A particularly important field of employment can be found in connection with the polymerase chain reaction (PCR) that is used to amplify DNA sequences. In quantitative or real-time PCR, either a fluorescent dye, such as Sybr green or Eva green, or a labeled sequence-specific DNA probe (Hybeacon, hydrolysis probe or Light-ON/OFF probe) is added to a liquid analyte containing a specific DNA sequence and is then cyclically heated and cooled to amplify the amount of the contained DNA sequence. The fluorescent dyes or DNA probes used only bind to the reaction product of the PCR and in the bound state emit fluorescent light when excited with suitable excitation light. Thus, an increase in the amount of the reaction product causes an increase in the intensity of the fluorescent light generated in the analyte, which can be determined in each amplification cycle in real-time by an optical fluorescence measurement by means of a suitable detector. This allows a quantitative determination of the respective DNA concentration in the analyte by comparing it with a standard analyte. The obtained measured data can be plotted in a logarithmic chart regarding the number of cycles to determine the relative or absolute amount of the amplified DNA by means of suitable computer software.

Similar methods and devices for measuring fluorescence may also be applied e.g. in melting curve analysis (MCA) in which the decomposition properties of DNA upon heating regarding the temperature are measured.

Devices for carrying out quantitative or real-time PCR by means of optical fluorescence measurements on DNA in analytes are often also referred to as "real-time cycler".

These real-rime cyclers comprise facilities for alternately heating and cooling analytes in an array of reaction vessels during the cycles of the quantitative or real-time PCR and for heating the analyte during the melting curve analysis, an excitation light source for exciting the fluorescent dye in the analyte as well as an optical fluorescent detector for sensing and measuring the intensity of the fluorescent light emitted as a result of the excitation.

The reaction vessels are usually part of a microwell plate that can replaceably be placed in the real-time cycler and in which the reaction vessels are arranged in a particular arrangement (array). In the 96 microwell plates usually used for that the array of reaction vessels is a 8×12 array into the reaction vessels of which the analytes are introduced before a transparent sealed cover is welded or adhered to the upper surface of the microwell plate to close the reaction vessels and prevent contamination. The reaction vessels are also referred to as small bowls or reaction cavities.

In order to prevent condensation of evaporated analyte on the covering real-time cyclers usually have a heatable cover that, for most of the real-time cyclers in use, is provided with holes. On the one hand, by the holes the excitation light is directed into the reaction vessels below the cover from above and on the other hand, the fluorescent light generated in the analytes is sensed by the fluorescent detector from above. The arrangement of the holes in the cover corresponds to the arrangement of reaction vessels below the cover, so that a hole is assigned to each reaction vessel. Since the depth of the reaction vessels is much larger than the diameter of an opening at the upper end of the reaction vessel most of the optical real-time cyclers used today have a telecentric lens system having a field lens that on the one hand is arranged between the excitation light source and the cover and on the other hand also between the cover and the fluorescent detector. The field lens is for orienting the excitation light from the excitation light source in parallel before it passes through the holes in the cover, so that the optical axes of the beams passing through the holes in the cover are aligned with the longitudinal center axes of the reaction vessels. However, further the field lens is also for bundling or focusing the beams of the fluorescent light that are emitted by the analytes in the reaction vessels and emerge upwards through the holes in the cover in parallel, so that they converge toward the detector.

If several light sources (LEDs) are used, as described for example in US 2006/0133080, a field lens is not needed. However, such devices not only have an excitation light source, as disclosed according to the invention, but several LEDs. U.S. Pat. No. 5,355,215 discloses a method for measuring the fluorescence of a cell culture layer coated with a liquid. Illumination is from below as is also the measuring of the fluorescence. The cells adhered to the bottom of the culture exhibit an other fluorescence than the cell medium with the fluorescent dye. Here, it is not necessary to determine the fluorescence in the liquid layer and to close the reaction vessel with a heatable cover. The so far known solutions without a field lens are not suitable for the present problem.

Examples of today-used optical real-time cyclers having a telecentric lens system are disclosed in EP 1 619 491 B1, EP 1 681 555 B1, EP 1 681 556 B1, or U.S. Pat. No. 7,687,260 B2. Further, EP 1 619 491 B1 discloses an optical real-time cycler in which the field lens is configured as a Fresnel lens. In addition, also real-time cyclers are known that have an array of small field lenses each arranged above the reaction vessels, instead of a single large field lens.

If there is used only one field lens this must have a relatively large diameter so that the fluorescent light from all the holes of the cover can be bundled by the field lens and directed toward the detector. In addition, the field lens must be of very high optical quality in order to minimize optical interferences and thus, losses of fluorescent light. As a result, development and manufacture of such field lenses is costly and time-consuming, which is also reflected in the production costs of the real-time cycler. Also, these problems cannot be avoided by a plurality of small field lenses.

Starting with that, the invention is based on the problem to improve a method and a device of the kind mentioned at the beginning such that it can be refrained from one or more field lenses or telecentric lens system, respectively.

To solve this problem, the method according to the invention suggests to direct the plurality of beams of the excitation light with diverging main beams through the holes of the cover from above into the reaction vessels and/or to direct the plurality of beams of the fluorescent light with converging main beams through the holes of the cover from below and then toward the fluorescent detector. The device according to the invention is characterized in that the main beams of the plurality of beams of the excitation light diverge within and below the holes into the reaction vessels and/or in that the main beams of the plurality of beams of the fluorescent light converge within and above the holes toward the fluorescent detector.

Thus, the solution according to the invention on the one hand refrains from orienting the plurality of beams of the excitation light in parallel by means of a field lens before they pass through the holes of the cover, but directs the excitation light from the excitation light source directly through the holes of the cover. When using a point-shaped or generally point-shaped excitation light source this means that the beams entering the reaction vessels also have to diverge within and below the cover.

The solution according to the invention on the other hand refrains from focusing the beams of the fluorescent light after they have passed through the holes of the cover by means of a field lens on the fluorescent detector, which then measures the intensity of the fluorescent light from all the reaction vessels at the same time. As a result of orienting the holes this means that the beams emerging from the holes converge toward the fluorescent detector.

By the above measures it can be refrained from the development of a high-quality and interference-free field lens and the considerable costs associated therewith can be saved. In addition, light efficiency can be enhanced, because without a field lens no retroreflexion of fluorescent light downwards to the cover can occur. Moreover, also interfering reflections of the excitation light on the surfaces of the field lens or field lenses are prevented.

In order to sense the fluorescent light and measure its intensity at the same time, the fluorescent detector advantageously comprises a camera with semiconductor sensors (e.g., CCD or CMOS) that sense the converging beams of the fluorescent light from the various reaction vessels, which pass upwards through the holes of the cover, on different sectors of a CCD or CMOS array of the camera that are assigned to the individual reaction vessels and evaluate the intensity of the sensed fluorescent light.

The excitation light source is preferably a point-shaped or generally point-shaped light source. Most preferably, a light emitting diode (LED) is used that emits excitation light with a defined wavelength spectrum. Suitably, an excitation optical system that advantageously comprises a homogeneous light source, an excitation objective, and an excitation filter is located between the excitation light source and the cover. The homogeneous light source is supposed to generate a light spot with a homogeneous light distribution on its front face facing away from the excitation light source and facing the excitation objective. Said device is to provide a homogeneous light distribution. The excitation filter filters undesired wavelengths out of excitation light. To allow the optical axis of the light mixer, the excitation objective, and the excitation filter to be oriented horizontally for reasons of space additionally a coupling-in mirror can be provided between the excitation objective and the cover that reflects the excitation light downwards to the cover.

A detecting optical system that is a standard optical system without a field lens is arranged between the cover and the fluorescent detector. The detecting optical system advantageously comprises a detection filter and a detection objective that is suitably a commercial objective without telecentric properties. The detection filter filters undesired wavelengths out of the fluorescent light. Advantageously, no further lenses, prisms, or other optical components are arranged in the light path of the fluorescent light between the cover and the detector in addition to the detection filter and the detection objective.

In order to on the one hand direct as much excitation light as possible through the holes of the cover into the reaction vessels and on the other hand further increase the yield of the fluorescent light sensed by the detector the holes are preferably not oriented perpendicular to the plane of the cover as with known telecentric lens systems in real-time cyclers, but have diverging longitudinal center axes between an upper surface and a lower surface of the cover. According to a further preferred development of the invention these longitudinal center axes intersect above the cover in a common point of intersection that is preferably within the detection objective, so that the holes direct the fluorescent light directly toward the detection objective and thus, toward the fluorescent detector. This also means that the inclination angle of the holes and the inclination angle of their longitudinal center axes, respectively with respect to the midperpendicular or to the perpendicular of the plane of the cover increases outwardly from the center of the cover.

Here, the longitudinal center axis of each hole in the cover may be oriented either such that it is aligned with the main beam of the beam of the excitation light that passes through the respective hole or of the beam of the fluorescent light that passes through the respective hole.

Moreover, the longitudinal center axis of each hole in the cover however, can also be oriented such that it is aligned with the angle bisector of the main beams of the beams of the excitation and fluorescent light that passes through the respective hole.

In another embodiment the longitudinal center axis of each hole can be oriented at right angles to the cover; but this means that the hole has a larger diameter. Therefore, this embodiment can only be chosen if the cover can satisfactorily accomplish the condensation protection by an appropriate temperature (generally more than 105°).

A further preferred development of the invention provides that a common optical axis of all beams of the excitation light, according to the optical axis of the excitation optical system arranged between the excitation light source and the cover, is oriented such that it comprises an angle unequal to 90 degrees with a plane of the cover and/or of the array of reaction vessels.

In contrast to this, a common optical axis of all beams of the fluorescent light, according to the optical axis of the detecting optical system arranged between the cover and the fluorescent detector, according to a further advantageous development of the invention, is oriented such that it comprises an angle equal to 90 degrees with a plane of the cover and/or of the array of reaction vessels and a small angle $\alpha$ with the common optical axis of all beams of the excitation light and the optical axis of the excitation optical system, respectively. In this way, the light path of the excitation light and the light path of the fluorescent light are separated.

On the one hand, this is of advantage in that possible excitation light reflected at the covering of the reaction vessel or at the liquid mirror of the analytes is reflected away to the opposite side using an angle corresponding to the angle of incidence and hence, cannot reach the detector. In this way, quality of the measurement results is enhanced. On the other hand, a further advantage of such an off-axis illumination is that a beam splitter, as illustrated and described e.g. in U.S. Pat. No. 7,687,260 B2 mentioned above, is non-essential. In this way, efficiency of sensing the fluorescent light is enhanced by a factor of 4, since neither 50% of the excitation light nor 50% of the fluorescent light in the beam splitter get lost. In addition, an excitation light source of low light intensity can be employed. The advantages mentioned are achieved especially if in accordance with a further preferred development of the invention the above-mentioned small angle α between the optical axes of the excitation optical system and the detecting optical system on the one hand is larger than the sum of the object-side apertures of the excitation optical system and the detecting optical system, but on the other hand is less than 10 degrees, preferably less than 5 degrees, and most preferably narrowly 3 degrees, in order to minimize shadow effects in the reaction vessels.

However, basically in order to separate the excitation light from the fluorescent light to be sensed it is also possible to use a beam splitter or a polarizing beam splitter.

In order to, on the one hand, permit use of conventional microwell plates in which the adjacent reaction vessels in the array of reaction vessels are equally spaced apart from each other and on the other hand to be able to further minimize the shadow effects, the longitudinal center axes of adjacent holes, according to another advantageous development of the invention, have slightly smaller distances than the longitudinal center axes of adjacent reaction vessels to take into consideration the divergence of the holes. This measure results in that the holes are not exactly arranged above the reaction vessels, but are offset toward the center of the cover, wherein the offset increases with an increase in the distance from the center of the cover.

When using conventional microwell plates in which the reaction vessels have parallel longitudinal center axes the shadow effects can also be minimized in that the longitudinal center axes of the reaction vessels, in accordance with a further preferred development of the invention, each intersect within the reaction vessels with the longitudinal center axis of the associated holes.

Tests have shown that with the above measures no noticeable shadowing of the excitation light could be observed within the reaction vessels with an off-axis illumination tilted by a few degrees.

Suitably, the holes in the cover are bore holes, i.e. holes of a circular cross-section, since such holes having a 5 or 6 axis machining center can readily be introduced into the cover with the desired orientation.

Advantageously, the cover is heatable to prevent condensation of the analytes on transparent coverings of the reaction vessels.

Since with microwell plates the reaction vessels in the array of reaction vessels are arranged in straight lines and columns it is of advantage if the optical axis of the detecting optical system coincides with the intersection line of two symmetry planes of the microwell plate, which are perpendicular to each other and to which the reaction vessels are mirror symmetrical in the lines and columns, respectively. In this way, the holes in the cover can be rotation-symmetrically arranged with respect to the optical axis of the detecting optical system perpendicular to the plane of the cover, what facilitates programming of the drilling operation in the machining center.

In the following, the invention is explained in detail with the help of an example illustrated in the drawings.

Figure 1:
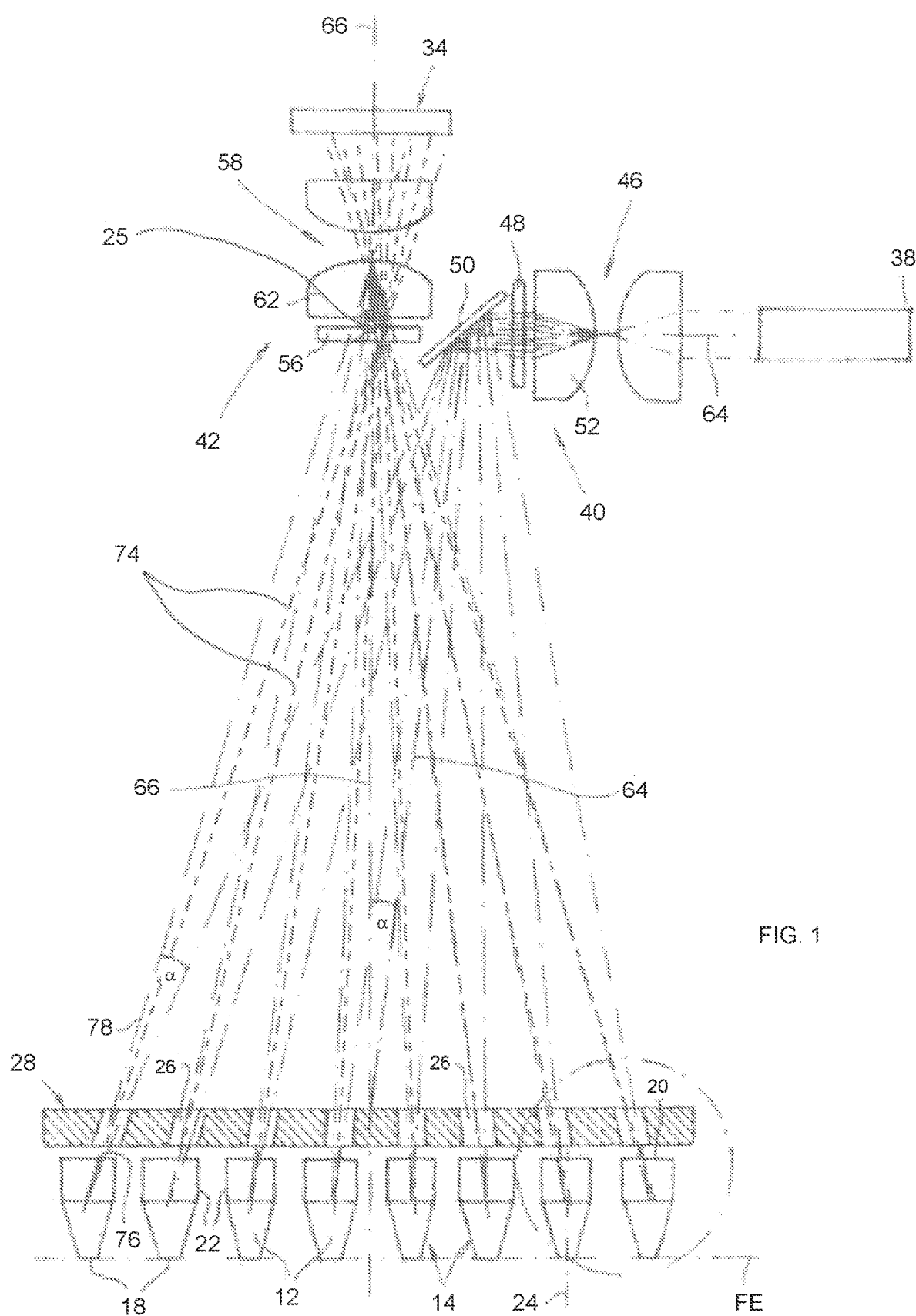
FIG. 1 shows a schematic sectional view of a device according to the invention as part of a real-time cycler.

The real-time cycler 10 only partially and schematically illustrated in FIG. 1 is for performing quantitative or real-time PCR in liquid analytes 12 in reaction vessels or small bowls 14 of a microwell plate 16, wherein for each small bowl 14 the amount of a DNA sequence, that is contained in the liquid analyte 12 together with a fluorescent dye, is cyclically amplified and measured. For that, the analytes 12 in the small bowls 14 jointly are subjected to a thermal alternating treatment so as to alternatingly heat and cool them. In each heating cycle the amount of the DNA sequence in the analytes 12 is amplified by the polymerase chain reaction. The fluorescent dye bound to the reaction product emits fluorescent light when it is excited with excitation light. Since the intensity of the emitted fluorescent light depends on the amount of the reaction product latter can be quantitatively determined by an optical fluorescence measurement via the real-time cycler 10 and by comparing it with a standard analyte.

Figure 3:
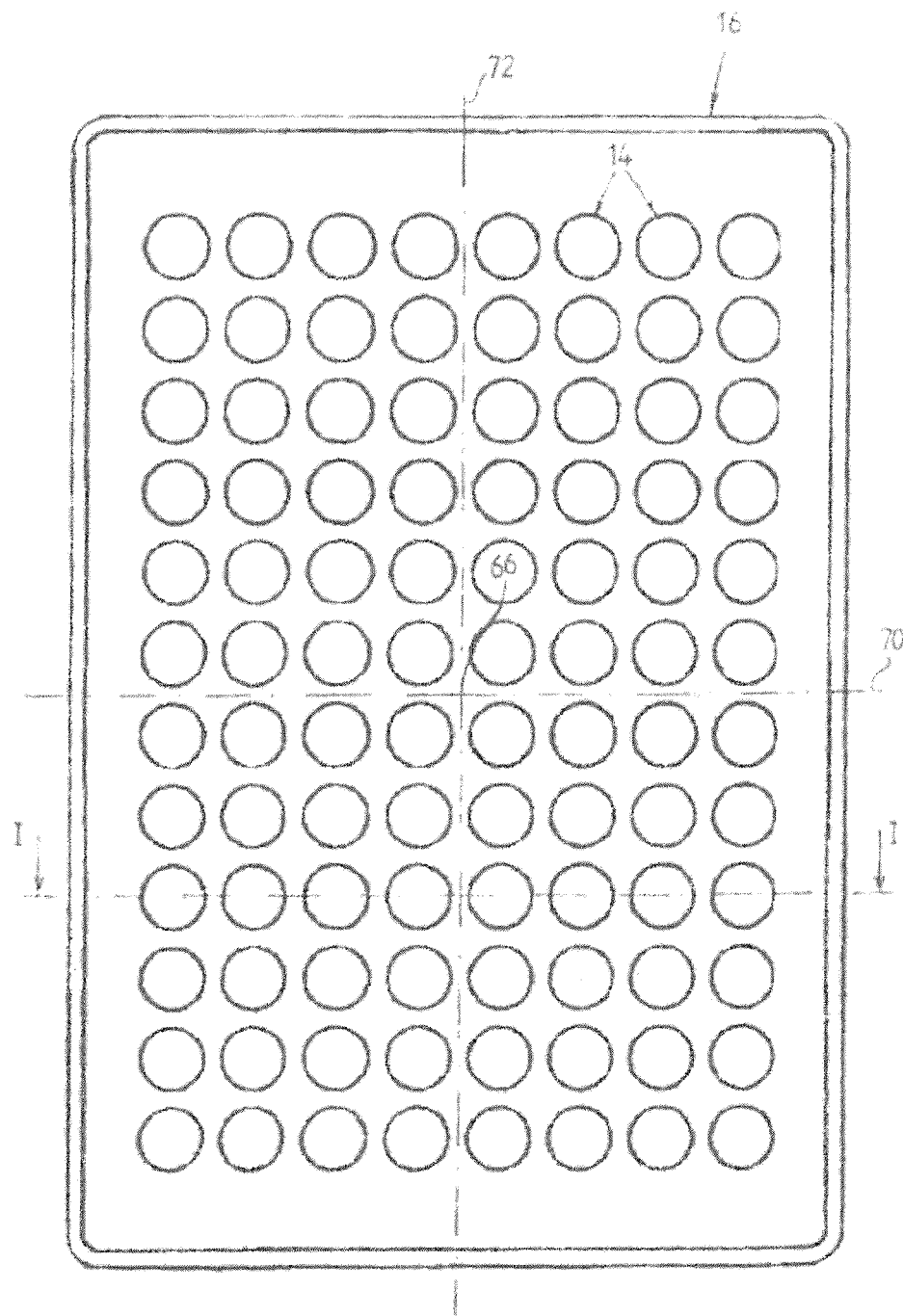
FIG. 3 shows a plan view of a microwell plate that can be used together with the real-time cycler, and the intersection point of the optical axis of a detecting optics of the real-time cycler with the microwell plate.

Microwell plate 16 may be for example the microwell plate illustrated in FIG. 3 that has a 96 array of 8×12 small bowls 14. Alternatively, the real-time cycler 10, however, may also be adapted to be used with other microwell plates, for example with microwell plates having a 384 array of 16×24 small bowls, or with microwell plates having a 48 array of 6×8 small bowls. Small bowls 14 each have a bottom 18, an upper end closed by a transparent covering 20, and side walls 22 that are concentric to a longitudinal center axis 24.

As schematically illustrated in FIG. 1, microwell plate 16 having the small bowls 14 is positioned in the real-time cycler 10 such that it is arranged below a flat cover 28 provided with holes 26. The holes 26 in the cover 28 direct a beam 30 (FIG. 2) of the excitation light being incident to the cover 28 from above into each of the small bowls 14 of the microwell plate 16 and shield the remaining excitation light. In addition, the holes 26 let pass a beam 32 (FIG. 2) of fluorescent light generated as a result of the excitation in the analyte 12 from each of the small bowls 14 of the microwell plate 16 upwards to a fluorescent detector 34. The holes 26 in the cover 28 are bore holes each arranged somewhat above the small bowls 14 of the microwell plate 16, wherein their number corresponds to the number of small bowls 14 of the microwell plates 16 to be introduced into the real-time cycler 10.

In order to prevent contamination and/or evaporation of the analytes 12, the small bowls 14 at the upper end are closed by a welded on or adhered transparent covering (not illustrated). Cover 28, for example contains integrated resistance heaters (not illustrated) that allow the cover 28 to be heated to prevent condensation of the analytes 12 at the covering.

Above the microwell plate 16 and the cover 28 the real-time cycler 10 contains an optical device 36 for exciting the fluorescent dye in the analytes 12 with the excitation light and at the same time for sensing or measuring, respectively the intensity of the fluorescent light emitted by the analytes 12 as a result of the excitation. The device 36 comprises an excitation light source 38 emitting the excitation light, an excitation optical system 40 arranged between the excitation light source 38 and the cover 28, the fluorescent detector 34 for simultaneously measuring the intensity of the fluorescent light emitted by all analytes 12 as well as a detecting optical system 42 arranged between the cover 28 and the detector 34.

The excitation light source 38 is a light emitting diode (LED), while the fluorescent detector 34 is a CCD or CMOS camera sensitive to fluorescent light. The camera comprises an array of light-sensitive CCDs or CMOSs each of which sense the intensity of the emitted fluorescent light from one of the small bowls 14 of the microwell plate 16.

The simplified excitation optical system 40 comprises a homogeneous light source 38, an excitation objective 46, an excitation filter 48, and a coupling-in mirror 50 that are arranged in the beam direction of the excitation light in this order between the excitation light source 38 and the cover 28. The excitation objective 46 is supposed to focus the excitation light from the homogeneous light source 38 in a focal plane FE spread out from the bottoms 18 of the small bowls 14 of the microwell plate 16, wherein it has a great focal depth. The excitation filter 48 filters undesired wavelengths out of the excitation light, while the coupling-in mirror 50 reflects the excitation light downward to the cover 28.

The also simplified detecting optical system 42 comprises a detection filter 56 and a detection objective 58 that are arranged in this order between the cover 28 and the detector 34 in the beam direction of the fluorescent light emitted by the analytes 14 toward the detector 34.

The focus of the detection objective 58 is at the upper surface of the cover 28 in order to obtain as low optical crosstalk of the fluorescent light from adjacent small bowls 14 of the microwell plate 16 as possible. The detection filter 56 is to filter undesired wavelengths out of the fluorescent light.

The excitation optical system 40 has an optical axis 64 horizontally oriented between the excitation light source 38 and the coupling-in mirror 50 and extends from the coupling-in mirror 50 at an inclination angle between 87 and 88 degrees downward to the cover 28. The detecting optical system 42 has an optical axis 66 perpendicular to a plane spread out from the cover 28 or the microwell plate 16, respectively and to the focal plane FE. In this way, the optical axis 64 of the excitation optical system 40 is inclined below the coupling-in mirror 50 with respect to the optical axis 66 of the detecting optical system 42 at a small angle α between 2 and 3 degrees. In order to prevent that excitation light can directly be reflected to the detector 34 at the liquid mirror 68 of the analytes 12 in the small bowls 14 of the microwell plate 16 this angle α greatly enlarged in FIG. 1 for better explanation is larger than the sum of the object-side apertures of the excitation optical system 40 and of the detecting optical system 42.

As can be seen from FIGS. 1 and 3, the microwell plate 16 when introduced into the real-time cycler 10 is centered with respect to the optical axis 66 of the detecting optical system 42, so that the optical axis 66 is aligned with an intersection line of two symmetry planes 70, 72 of the microwell plate 16 perpendicular to the plane of the cover 28 that are in parallel to the lines or columns, respectively of small bowls 14 of the microwell plate 16. Said intersection line coincides with a midperpendicular of the cover 28. Moreover, FIG. 3 shows the sectional plane I-I of FIG. 1.

Figure 2:
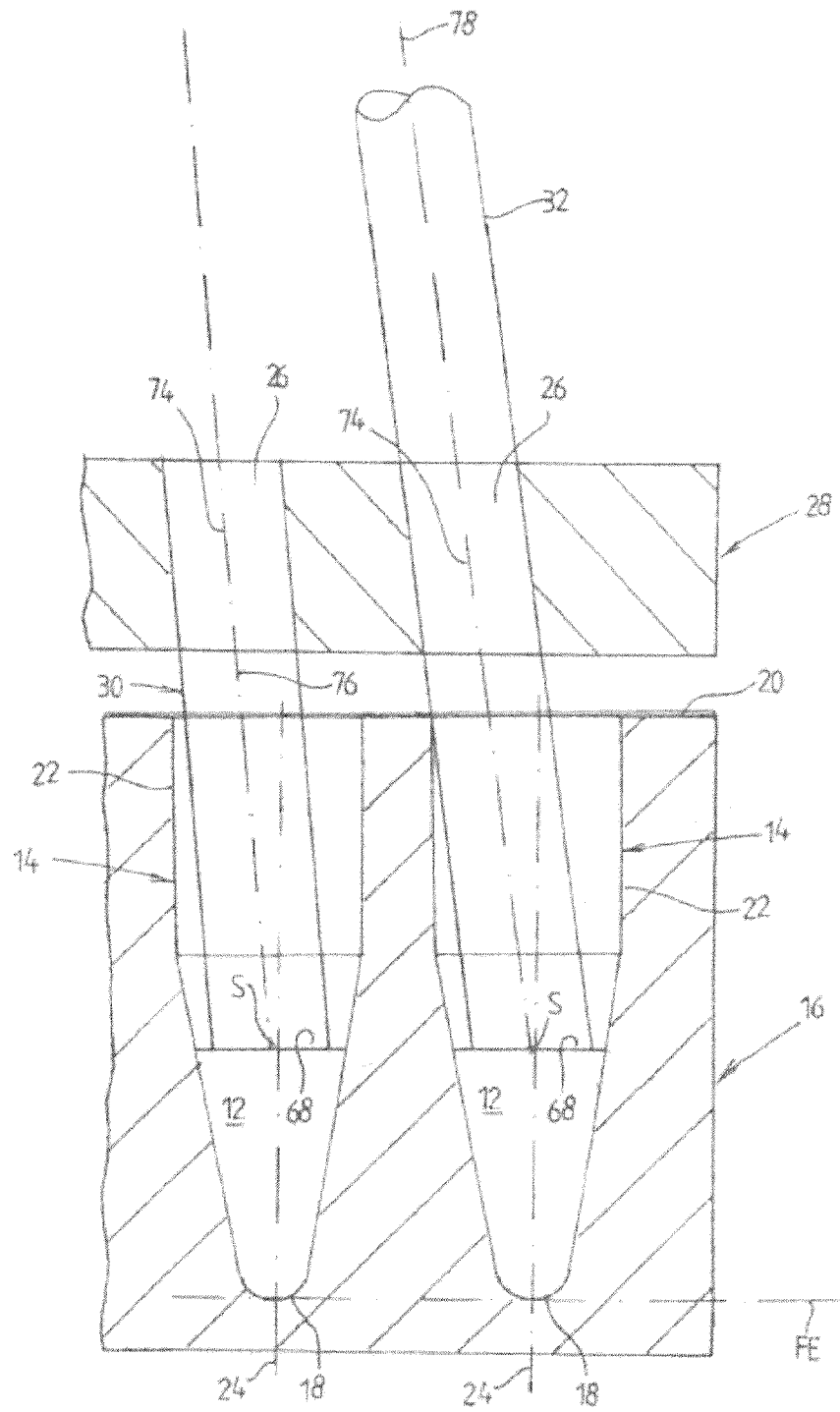
FIG. 2 shows an enlarged view of the detail II in FIG. 1.

In order that the real-time cycler 10 can do without a telecentric optics or without a field lens arranged above the cover 28 in the real-time cycler 10 each bore hole 26 is oriented in the cover 28 such that its longitudinal center axis 74 is aligned with the angle bisector of angle α between a main beam 76 of the beam 30 of the excitation light passing downward through the bore hole 26 and a main beam 78 of the beam 32 of the fluorescent light passing upward through the bore hole 26, as is illustrated in FIG. 1 on the left and in FIG. 2. In this case, the longitudinal axes 74 of all bore holes 26 in the cover 28 are oriented such that they intersect each other in the area between the excitation optical system 40 and the detecting optical system 42, wherein the intersection point is on the angle bisector of angle α that is encompassed by the optical axes 64 and 66, respectively of the excitation optical system 40 and of the detector optical system 42.

Since the optical axis 66 of the detecting optical system 42 and the optical axis 64 of the excitation optical system 40 converge toward the cover 28 at an angle α of only a few degrees, alternatively, the bore holes 26 in the cover 28 can also be oriented such that their longitudinal center axes 74 are aligned either with the main beams 76 of the beam 30 of the excitation light passing downward through the bore holes 26, as illustrated in FIG. 2 on the left, or with the main beams 78 of the beam 32 of the fluorescent light passing upward through the bore holes 26, as illustrated in FIG. 2 on the right.

In the first case, the bore holes 26 are oriented such that all longitudinal center axes 74 intersect within of the excitation objective 46, wherein the intersection point is in the main plane of the excitation objective 46 adjacent to the excitation filter 48. In the latter case, the longitudinal center axes 74 of the bore holes 26 are oriented such that they intersect each other within the detection objective 58, wherein the intersection point is in the main plane of the detection objective 58 adjacent to the detection filter 56.

With such an orientation of the bore holes 26 it is achieved that on the one hand the beam 30 of the excitation light passing downward through the bore holes 26 and entering the small bowls 14 of the microwell plate 16 also have diverging main beams 76 within the bore holes 26 and below the cover 28 as well as within the small bowls 14, as can be seen from FIGS. 1 and 2, and that on the other hand the beam 32 of the fluorescent light passing through the bore holes 26 have main beams 78 within the bore holes 26 and above the cover 28 that converge upward to the detector 34 or the detecting optical system 42, respectively.

That means that near the center of the cover the bore holes 26 are inclined with respect to a midperpendicular of the cover 28 or a perpendicular to the plane of the cover 28 at a smaller inclination angle than near the edge of the cover, as can be seen from FIG. 1. Here, the inclination angle of the longitudinal center axes 74 of the bore holes 26 with respect to the midperpendicular of the cover or the perpendicular of the cover plane or the parallel focal plane FE increases outwardly from the center of the cover, so that the bore holes 26 that are farthest away from the center of the cover above the small bowls 14 in the four corners of the microwell plate 16 have the largest inclination angle with respect to the midperpendicular of the cover 28 or the perpendicular of the plane of the cover 28, as can also be seen from FIG. 1.

As best illustrated in FIG. 2, in contrast, all small bowls 14 of the microwell plate 16 have parallel longitudinal center axes 24 in a known manner. In order that the beam 30 of the excitation light as completely as possible enter the analytes 12 in the small bowls 14 and shadowing is completely or at least largely prevented, the bore holes 26 in the cover 28 are oriented with respect to the small bowls 14 of the microwell plate 16 such that the longitudinal center axes 74 of the bore holes 26 and the longitudinal center axes 24 of the small bowls 14 each intersect within the small bowls 14 in an intersection point S, preferably approximately at the level of the liquid mirror 68 of the analytes 12 in the small bowl 14. This provides a centering of the incident beam 30.

Figure 4:
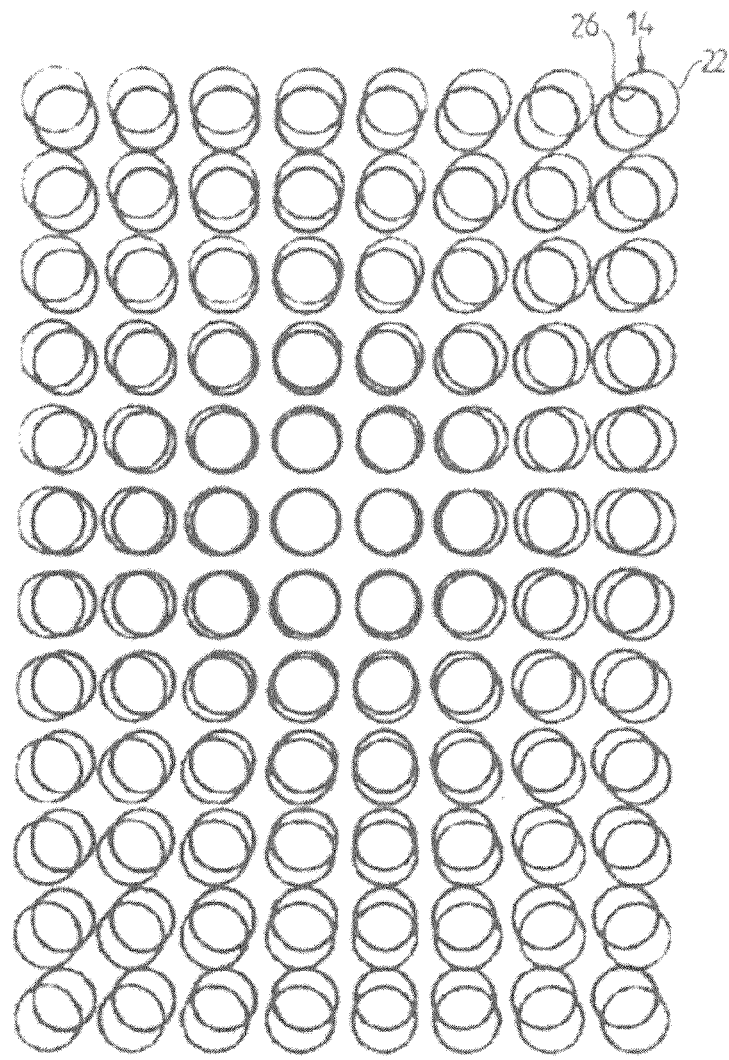
FIG. 4 shows an overlapped illustration of the small bowls of the microwell plate and the holes in the heatable cover of the real-time cycler seen from above.

Additionally, the center-to-center distances of the bore holes 26 of the cover 28 do not exactly correspond to the center-to-center distances of small bowls 14 of the microwell plate 16, but are somewhat smaller, as schematically illustrated in the overlapping of FIG. 4, so that the bore holes 26 have a somewhat smaller raster dimension than the small bowls 14. The consequence is that the centers of the mouth apertures of the bore holes 26 at the upper and lower sides of the cover 28 are somewhat offset toward the center of the cover with respect to the longitudinal center axes 24 of the associated small bowls 14, wherein the offset in each row and column of the bore hole or small bowls array, respectively increases away from the center of the cover to the outermost bore holes or small bowls, respectively, as can be seen from FIG. 4.

While no or only low shadowing effects occur using a 96-microwell plate even under unfavorable conditions, i.e. in the small bowls 14 at the corners of the microwell plate 16 where the inclination angle of the beam 30 of the excitation light is the largest with respect to the longitudinal center axis 24 of the small bowls, with an analyte volume of 50 µl or 14 µl, maximum shadowing of about 16% occurs with 384-microwell plates in the small bowls 14 at the corners of the microwell plate 16 with an analyte volume of 10 µl, what is within an acceptable framework.

The invention claimed is:

1. A device for optically exciting a plurality of analytes and for sensing fluorescent light from the analytes, wherein the device comprises an array of reaction vessels for receiving the analytes,
   one excitation light source for radiating the analytes in the reaction vessels with diverging excitation light,
   a fluorescent detector for sensing converging fluorescent light from the analytes in the reaction vessels at the same time, and
   a cover that is arranged above the array of reaction vessels, wherein the cover has an array of holes through which a plurality of beams of the excitation light from the excitation light source can enter the reaction vessels and a plurality of beams of the fluorescent light from the analytes can reach the fluorescent detector,
   wherein the excitation light source and the fluorescent detector are located outside the cover,
   wherein the plurality of beams of the fluorescent light converge toward the fluorescence detector within and above the holes, characterized in that no field lens is provided that orients the plurality of beams of the excitation light in parallel before they pass through the holes of the cover and focuses the beams of the fluorescent light to the fluorescence detector after they have passed through the holes of the cover,
   wherein the holes direct the plurality of beams of the fluorescent light, passing through the holes from below and then toward the fluorescent detector, converging by the orientation of the holes towards the fluorescent detector,
   wherein the holes extend from a top portion of the cover to a bottom portion of the cover,
   wherein the holes in the cover have longitudinal center axes that diverge downward between an upper surface and a lower surface of the cover so that the plurality of beams of excitation light diverge into the reaction vessels within and below the holes,
   wherein the holes and the reaction vessels are arranged so that the longitudinal center axes of the holes and the longitudinal center axes of the reaction vessels each intersect within the reaction vessel in an intersection point S.

2. The device according to claim 1, characterized by an excitation optical system arranged between the excitation light source and the cover and a detecting optical system arranged between the cover and the fluorescent detector, wherein the detecting optical system has an optical axis that is oriented perpendicular to a plane of the cover and/or the array of reaction vessels, and wherein the excitation optical system has an optical axis inclined at an angle toward the optical axis of the detecting optical system.

3. The device according to claim 2, characterized in that the angle between the optical axes of the excitation optical system and the detecting optical system is larger than the sum of the object side apertures of the excitation optical system and the detecting optical system and less than 5 degrees.

4. The device according to claim 3, characterized in that the longitudinal center axis of each hole is oriented such that it is aligned with the main beam of the beam of the excitation light passing through the hole or with the main beam of the beam of the fluorescent light passing through the hole or with an angle bisector of the main beams of the beams of the excitation and fluorescent light passing through the hole.

5. The device according to claim 3, characterized in that an inclination angle of the longitudinal center axes of holes increases outwardly away from the center of the cover with respect to a midperpendicular of the cover.

6. The device according to claim 3, characterized in that the longitudinal center axes of holes intersect in a common intersection point.

7. The device according to claim 3, characterized in that the reaction vessels have parallel longitudinal center axes that each intersect within the reaction vessels with the longitudinal center axes of the holes.

8. The device according to claim 3, characterized in that the longitudinal center axes of adjacent holes have smaller distances than the longitudinal center axes of adjacent reaction vessels.

9. The device according to claim 1, characterized in that the reaction vessels are arranged in straight lines and columns in the array of reaction vessels, and in that an optical axis of the detecting optical system oriented perpendicular to a plane of the cover and/or the array of reaction vessels is aligned with an intersection line of two symmetry planes, which are perpendicular to each other and to which the reaction vessels are mirror-symmetrical in the lines and columns, respectively.

10. The device according to claim 1, characterized in that the holes are bore holes.

11. The device according to claim 1, characterized in that the cover comprises integrated heaters.

* * * * *